(12) United States Patent
Luculli

(10) Patent No.: US 7,843,945 B2
(45) Date of Patent: Nov. 30, 2010

(54) INTERFACING OF CIRCUITS IN AN INTEGRATED ELECTRONIC CIRCUIT

(75) Inventor: Gabriele Luculli, Montbonnot Saint Martin (FR)

(73) Assignee: STMicroelectronics S.A., Montrouge (FR)

( * ) Notice: Subject to any disclaimer, the term of this patent is extended or adjusted under 35 U.S.C. 154(b) by 253 days.

(21) Appl. No.: 11/563,473

(22) Filed: Nov. 27, 2006

(65) Prior Publication Data

US 2008/0204075 A1 Aug. 28, 2008

Related U.S. Application Data

(63) Continuation of application No. 11/393,368, filed on Mar. 30, 2006, now abandoned.

(30) Foreign Application Priority Data

Apr. 4, 2005 (FR) .................................. 05 03325

(51) Int. Cl.
*H04L 12/28* (2006.01)
*H04L 12/56* (2006.01)

(52) U.S. Cl. .................... 370/395.6; 375/295; 710/305; 326/62

(58) Field of Classification Search ......... 710/305–317; 326/62; 370/395.6; 375/295
See application file for complete search history.

(56) References Cited

U.S. PATENT DOCUMENTS

| 4,965,793 | A | 10/1990 | Polzin et al. |
| 5,195,184 | A | 3/1993 | Peterson et al. |
| 5,379,297 | A * | 1/1995 | Glover et al. ................ 370/234 |
| 5,604,866 | A | 2/1997 | Kolb et al. |
| 5,777,995 | A * | 7/1998 | Alonso et al. ............ 370/395.6 |
| 5,812,550 | A * | 9/1998 | Sohn et al. ............... 370/395.4 |
| 6,778,548 | B1 * | 8/2004 | Burton et al. ............... 370/429 |
| 7,239,669 | B2 * | 7/2007 | Cummings et al. .......... 375/295 |

FOREIGN PATENT DOCUMENTS

EP 0380856 A2 8/1990

(Continued)

OTHER PUBLICATIONS

Kung, H., et al., "Credit-Based Flow Control for ATM Networks," IEEE Network Magazine, pp. 1-11, Mar. 1995.

(Continued)

*Primary Examiner*—James H. Cho
*Assistant Examiner*—Jason Crawford
(74) *Attorney, Agent, or Firm*—Lisa K. Jorgenson; Thomas J. Satagaj; Seed IP Law Group PLLC

(57) ABSTRACT

An interface having internal conductors to transfer data between a sending circuit and a receiving circuit in an integrated electronic circuit, the receiving circuit including an input buffer capable of receiving data and an output terminal for sending to the sending circuit an item of extraction information on each extraction of a data word from the input buffer, and the sending circuit including an enable circuit capable of activating an enable signal according to an item of availability information representative of the memory space available in the input buffer. The item of availability information is updated in the sending circuit on each transmission of a data word or on each receipt of the item of extraction information.

28 Claims, 4 Drawing Sheets

FOREIGN PATENT DOCUMENTS

| | | |
|---|---|---|
| EP | 0433078 A2 | 6/1991 |
| EP | 1006449 | 6/2000 |

OTHER PUBLICATIONS

Universite Paris VI—Pierre Et Marie Curie U.F.R. D'Informatique, "Un Reseau D'Interconnexion Pour Systems Integres", May 20, 2000, 53 pages.

Zeferino, C., et al., "A Study on Communication Issues for Systems-on-Chip", Universidade Federal do Rio Grande do Sul—Instituto de Informatica, 6 pages.

Translation of parts of Guerrier, P., "An Interconnection Network for Systems-on-a-Chip", May 10, 2000, previously submitted in an IDS on Apr. 23, 2007.

* cited by examiner

INTERFACING OF CIRCUITS IN AN INTEGRATED ELECTRONIC CIRCUIT

CROSS-REFERENCE TO RELATED APPLICATION

This application is a continuation of U.S. patent application Ser. No. 11/393,368, filed Mar. 30, 2006, now abandoned, which application is incorporated herein by reference in its entirety.

BACKGROUND OF THE INVENTION

1. Field of the Invention

The invention relates to the interfacing of circuits inside an integrated electronic circuit and, more particularly, to the control of data streams between various entities inside an integrated electronic circuit.

2. Description of the Related Art

Integrated circuit technology makes it possible to produce complex circuits on a single silicon chip. The evolution of the technology makes it possible to obtain an increasingly fine precision of etching, which can be used to increase the number of transistors for a given surface area while increasing the speed of operation and reducing the consumption of electricity. Large dimension circuits, for example those having a surface area greater than a square centimeter, which are currently produced with a fineness of etching of less than 90 nm, may thus comprise more than a billion transistors while operating at frequencies greater than a gigahertz.

Large dimension integrated electronic circuits are called "System On a Chip" or SOC because they correspond to complete electronic systems that may comprise several basic circuits such as microprocessors, memories and many interfaces. SOCs are designed by assembling several individually designed electronic circuits. The various electronic circuits communicate with one another via electric conductors of the appropriate interfacing means.

Known interfacing means include data buffers placed at the input of the electronic circuits to be interfaced. The data buffers are for example of the "First In-First Out" type, better known by the abbreviation FIFO. These data buffers are used to receive and store data in order to regulate the data stream according to the availability of the circuit. A circuit sending data may send data to a destination circuit before the latter is available to process them. However, before sending data to a data buffer, it is desirable to ensure that the latter has sufficient capacity to receive and store these data with a view to processing them.

Conventionally, FIFO buffers have outputs delivering items of information on the fill status, which indicate for example whether the buffer is full, half-full or empty. A problem arises when the integrated circuit is of large dimensions and operates at high clock frequencies. The higher the clock frequency, the shorter the time separating two data transmissions. Furthermore, in a large dimension integrated circuit, the electric conductors providing the connection between two circuits may be relatively long and hence introduce significant propagation times, which may be greater than a period of the clock signal used to synchronize the data transfer. In such a situation, the fill status information may reach the sending circuit after a surplus of data has been sent, which causes data to be lost.

A technique for remedying this problem consists in verifying before each data transmission whether the buffer of the receiving circuit is not full. Such a technique considerably slows the data transfers because it is then necessary to wait twice the propagation time necessary to route the data over a conductor between two successive data transmissions.

A similar problem of verifying the fill status of the data buffer exists in the field of broadband networks. It is necessary to ensure at a sending device that the data buffer of a receiving device has sufficient memory space before sending data packets, in order to avoid losses of information.

The article "Credit-Based Flow Control for ATM Networks", H. T. KUNG and R. MORRIS, IEEE Network Magazine, Mar. 1995, reveals a solution for improving the management of data transmissions to a remote data buffer without having to wait for information on the fill status of the said buffer. The solution consists in providing a counter in the data sending device to count the quantity of data sent to a data receiving device. The data receiving device also has a counter to count the quantity of data extracted from the data buffer. The status of the counter of the receiving device is regularly sent to the sending device and the said counter is reset to zero. On receipt, the data sending device calculates the remaining space available in the data buffer by subtracting the quantity of data sent and adding the quantity of data extracted, respectively from and to a variable corresponding to the total memory capacity of the data buffer.

However, a data buffer of a broadband network, such as an ATM network is extremely large, for example of the order of several megabits, and it is possible to use appropriate management means. In the case of an integrated circuit, the data buffers have a small capacity, for example a few tens of bytes. That is why it is unthinkable to have in an integrated circuit a management system as large as that of a broadband network.

In addition, in a broadband network such as the ATM, data may be lost, whereas in an integrated circuit the data always arrive correctly at their destination since the connection is a strip of metal.

BRIEF SUMMARY OF THE INVENTION

The disclosed embodiments of the present invention provide a solution to remedy the problem of filling a data buffer placed on a long internal connection of an integrated electronic circuit. The internal connection transfers data between a sending circuit and a receiving circuit, both of which are included in the integrated circuit. The receiving circuit comprises a data buffer capable of receiving data in the form of words (a data word comprising n bits, where n is a non-zero integer, but capable of being equal to unity) and an output terminal for sending to the sending circuit an item of extraction information when a word is extracted from the buffer. The sending circuit manages an item of availability information representative of the memory space available in the input buffer. This information is updated on each transmission of a data word by the sending circuit or on each receipt of an item of extraction information by the sending circuit or both.

A first aspect of the invention is an integrated electronic circuit that includes a first circuit (or receiving circuit) having an input port for receiving data words, an input terminal for receiving an enable signal, an input buffer coupled to the input port and capable of temporarily storing a determined number of data words received via the input port, a data word being stored in the buffer in response to the activation of the enable signal, and an output terminal for sending an item of extraction information when a data word is extracted from the input buffer; a second circuit (or sending circuit) that includes an output port for sending a data word, an output terminal for sending the enable signal, an input terminal for receiving the item of extraction information, and an enable circuit capable of activating the enable signal according to an item of information representative of the memory space available in the input buffer, the said item of availability information being updated on each transmission of a data word and on each receipt of the item of extraction information; and a plurality of conductors connecting together the first circuit and the second circuit, and comprising a data bus connecting the input port of the receiving circuit to the output port of the sending circuit, and a connection connecting the input terminal of the receiving circuit to the output terminal of the sending circuit, and a connection connecting the output terminal of the receiving circuit to the input terminal of the sending circuit.

Thus, unlike a broadband network such as an ATM network that has a single bidirectional link connecting a transmitter and a receiver on which all the traffic travels (payload data and signalling information), the circuit defined hereinabove has several monodirectional links, particularly a link for transmitting payload data outgoing (that is to say from the sender to the receiver) and two control links for the transmission of signalling data including one outgoing link and one return link (from the receiver to the sender). Consequently, the flow control is simple and optimized.

In addition, unlike a flow control protocol used in a broadband network, such as an ATM network in which the receipt of data packets is acknowledged by the transmission of an acknowledgement message only for every N packets received, the extraction information managed in the circuit as defined hereinabove is updated on each clock cycle. Consequently, the flow control has better performance.

In one embodiment, the enable circuit includes a counter that is incremented on receipt of the item of extraction information and that is decremented on activation of the enable signal, the current value of the counter corresponding to the availability information.

In another embodiment, the enable circuit includes a logic circuit which activates the enable signal when a data word is presented to the output port if the value of the counter indicates that the input buffer has the memory space available to save at least one data word.

When the conductors have a data propagation time lying between k−1 and k times the minimal time that can separate two data words successively sent via the said conductors, where k is a positive integer, the number of data words that can be stored simultaneously in the input buffer may advantageously be greater than or equal to 2×k. This allows a data transfer with a maximum data rate, because this data rate is no longer, in the case of normal operation, limited by the flow control but only by the bandwidth of the data bus. However, this feature is not mandatory because the flow control method operates correctly as soon as at least one data word can be stored in the input buffer, which is the minimum.

Preferably, an item of extraction information is sent by the first circuit every time a data word is extracted from the input buffer.

A second aspect of the invention relates to a method of data transfer between a first circuit and a second circuit comprised in an integrated electronic circuit, the said first and second circuits being connected together by means of a plurality of conductors, and the first circuit comprising a data buffer capable of temporarily storing a determined number of data words, the said method comprising the following steps:

transmission by the second circuit of a data word to the data buffer if an item of availability information representative of the memory space available in the input buffer indicates that at least one data word may be stored in the said input buffer; in response to the extraction of a data word from the buffer, transmission by the first circuit of an item of extraction information to the second circuit; and, in response to the transmission of a data word by the second circuit and/or in response to the receipt by the second circuit of an item of extraction information, updating of the item of availability information by the second circuit.

In one embodiment, the transmission of a data word by the second circuit includes the steps of:

placing the data word on a data bus connecting an output port of the first circuit to an input port of the first circuit, and, activation of an enable signal transmitted between an output terminal of the second circuit and an input terminal of the first circuit, if the item of availability information indicates that the input buffer has the memory space available to save at least one data word.

Preferably, the availability indicator is updated by incrementing the value of a counter in response to the receipt by the second circuit of an item of extraction information, and by decrementing the value of the said counter in response to the transmission of a data word by the second circuit.

In accordance with another embodiment of the invention, a circuit is provided that includes an output circuit comprising a buffer configured to receive data in response to a first control signal and to output data in response to an extraction signal; and an input circuit the includes an enable circuit configured to receive an enable signal and the extraction signal and to generate the first control signal in response thereto, and further comprising a data register for storing the data and transferring the data to the buffer in response to the enable signal and the extraction signal.

In accordance with yet a further embodiment of the invention, a circuit for interfacing a data transmitter circuit with a data receiver circuit is provided, the interfacing circuit includes an input circuit coupled to the data transmitter circuit, the input circuit having a register to store data from the transmitter circuit and to transfer the data, an enable logic circuit receiving an enable signal and a selection signal from the transmitter circuit and generating an enabling signal in response thereto, and an enable circuit configured to receive the enabling signal from the enable logic circuit and an extraction signal from the data receiver circuit and to generate a control signal in response thereto; and an output circuit coupled to the data receiver circuit, the output circuit including a buffer configured to receive the data from the register of the input circuit in response to the control signal and to transfer the data to the data receiver circuit from the buffer in response to the extraction signal.

In accordance with yet another aspect of the foregoing invention, a method for interfacing a data transmitter circuit with a data receiver circuit is provided, including using an interfacing circuit that includes an input circuit coupled to the transmitter circuit and including a register to store data from the transmitter circuit and to transfer the data, and an enable circuit configured to receive an enable signal from the transmitter circuit and an extraction signal from the receiver circuit and to generate a control signal, and the interfacing circuit also including an output circuit coupled to the receiver circuit, the output circuit having a buffer configured to receive the data from the input circuit in response to the control signal and to transfer the data to the receiver circuit in response to the extraction signal, the method including: generating a control signal in response to receipt of an enable signal and a selection signal from the data transmitter circuit; transferring data from the transmitter circuit to the register of the input circuit; receiving an extraction signal from the receiver circuit and transferring data from the register in the input circuit to the buffer in the output circuit; and transferring data from the buffer in the output circuit to the receiver circuit upon receipt of the extraction signal from the receiver circuit.

BRIEF DESCRIPTION OF THE SEVERAL VIEWS OF THE DRAWINGS

The invention will be better understood and other features and advantages will appear on reading the following description, made with reference to the appended drawings amongst which.

DETAILED DESCRIPTION OF THE INVENTION

Figure 1:
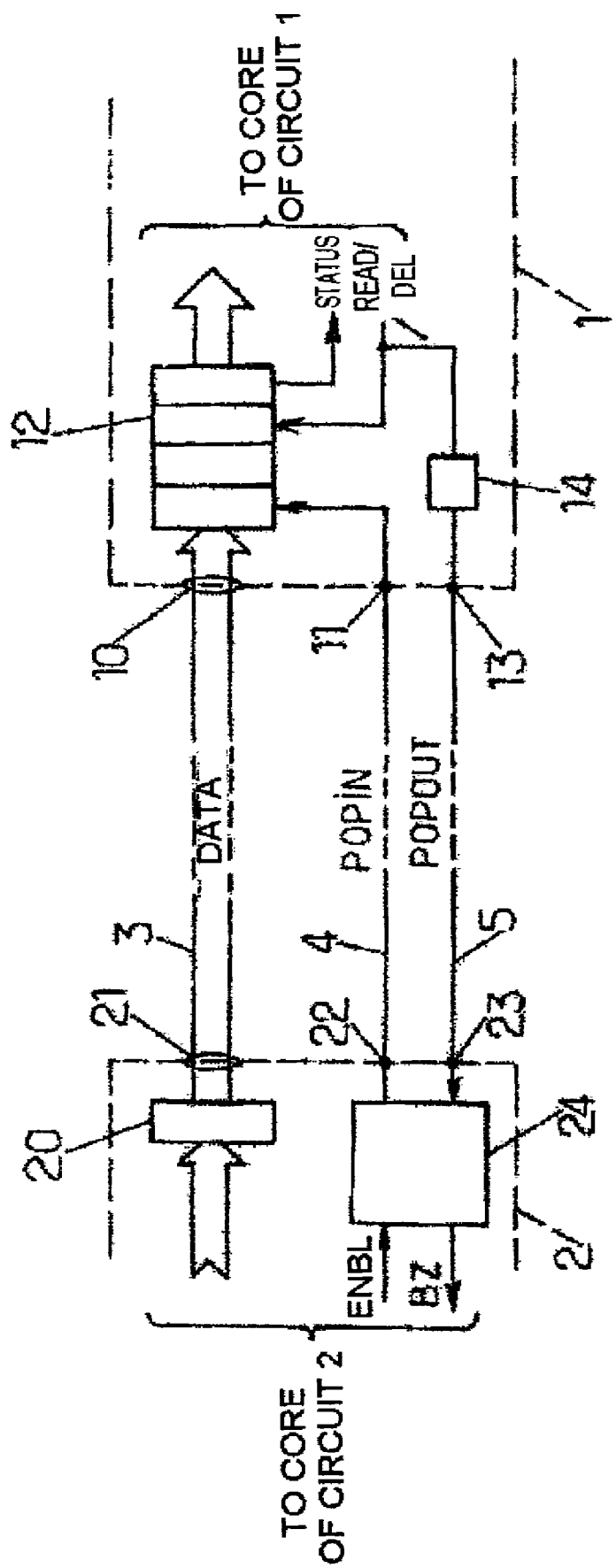
FIG. 1 is a diagram of an exemplary interfacing between two circuits in an integrated electronic circuit according to the invention.

FIG. 1 represents a portion of an integrated electronic circuit that includes an input stage of a first circuit 1 connected to an output stage of a second circuit 2 by means of conductors 3 to 5. This integrated circuit has a network for distributing a clock signal, which is not shown to prevent overloading the drawings. The clock signal distribution network is used to route the clock signal synchronously to all the circuits that use the signal according to a known method.

In one configuration of use, the first circuit 1 corresponds to a data receiving circuit whose input stage includes an input port 10, an input terminal 11, a data buffer 12, an output terminal 13 and a register 14. The second circuit 2 corresponds to a data transmission circuit whose output stage includes a data register 20, an output port 21, an output terminal 22, an input terminal 23 and an enable circuit 24.

The input port 10 and the output port 21 are connected together via conductors 3 forming a point-to-point connection bus, for example a parallel bus, although a serial bus and more generally any type of data link can also be envisaged.

The input terminal 11 is connected to the output terminal 22 via the conductor 4, which transports an enable signal POPIN. The input terminal 23 is connected to the output terminal 13 via the conductor 5, which transports an item of extraction information POPOUT. The conductors 3 to 5 are typically of great length, in the sense that they generate major propagation times relative to the period of the clock signal. However, the differences in length between the conductors 3 to 5 are small. Thus, it may be considered that the propagation times on the conductors 3 to 5 are substantially the same and generate no phase difference between two items of information sent simultaneously over two distinct conductors.

The register 20 of the sending circuit 2 is used to store a data word to be sent. A data entry in the register 20 is connected to the core of the circuit 2, and an output from the register 20 is connected to the output bus 21. On an active edge of the clock signal, the register 20 stores a data word present at the input and can supply it at the output on the next active edge. The data word is supplied by the core of the circuit 2 which also supplies a signal ENBL, which indicates that the word present in the register 20 must be sent to the first circuit 1.

The data buffer 12 of the receiving circuit 1 is used to temporarily store a determined number of data words received from the circuit 2. Such a buffer is used to time and regulate the data to supply them to the core of the circuit 1 taking account of the availability of the core. The data buffer 12 is for example a FIFO buffer, which has a word input connected to the input port 10, an input word enable input connected to the input terminal 11, a word read/delete input connected to the core of the circuit 1, a word output and a status output both connected to the core of the circuit 1.

A word present at the word input is written in the buffer 12 in response to an active edge of the clock signal when the enable signal POPIN is active. The word output delivers the oldest stored word, when the read/delete READ/DEL signal present on the read/delete input is active and when an active edge of the clock signal appears. The word present at the output is then considered read. It may be deleted by the writing of a word that is subsequently stored in the buffer. If the buffer 12 contains no word, particularly if all the words stored have been read, then the status output indicates that the buffer 12 is empty.

The register 14 is for example a register for a single bit, whose input is connected to the core of the circuit 1 and the output is connected to the output terminal 13. The register 14 is for sampling the signal present at the read/delete input in order to supply an item of data POPOUT representative of the extraction of a data word from the data buffer 12, for example when the data POPOUT is at "1" (corresponding to an active signal, that is to say to the high state). The register 14 is also used to isolate the core of the circuit 1 from the conductor 5, and to resynchronize the signal with the clock signal before sending it to the circuit 2.

The enable circuit 24 enables the transmission of a data word to the circuit 1. The enable circuit 24 is connected to the output terminal 22 to supply the signal POPIN and to the input terminal 23 to receive the data item POPOUT. The enable circuit 24 receives the signal ENBL from the core of the circuit 2 and supplies to the core a signal BZ. The signal BZ indicates, according to its state, whether the enabled word may or may not be sent to the first circuit 1. The enable circuit 24 permanently evaluates the memory space available in the data buffer 12, by incrementing or decrementing a variable CPT representative of the number of words that may be sent to the data buffer 12. The variable CPT is, for example, updated on each transmission of a data word or on each receipt of the active signal POPOUT representative of the extraction of a data word from the data buffer 12 or both.

Figure 2:
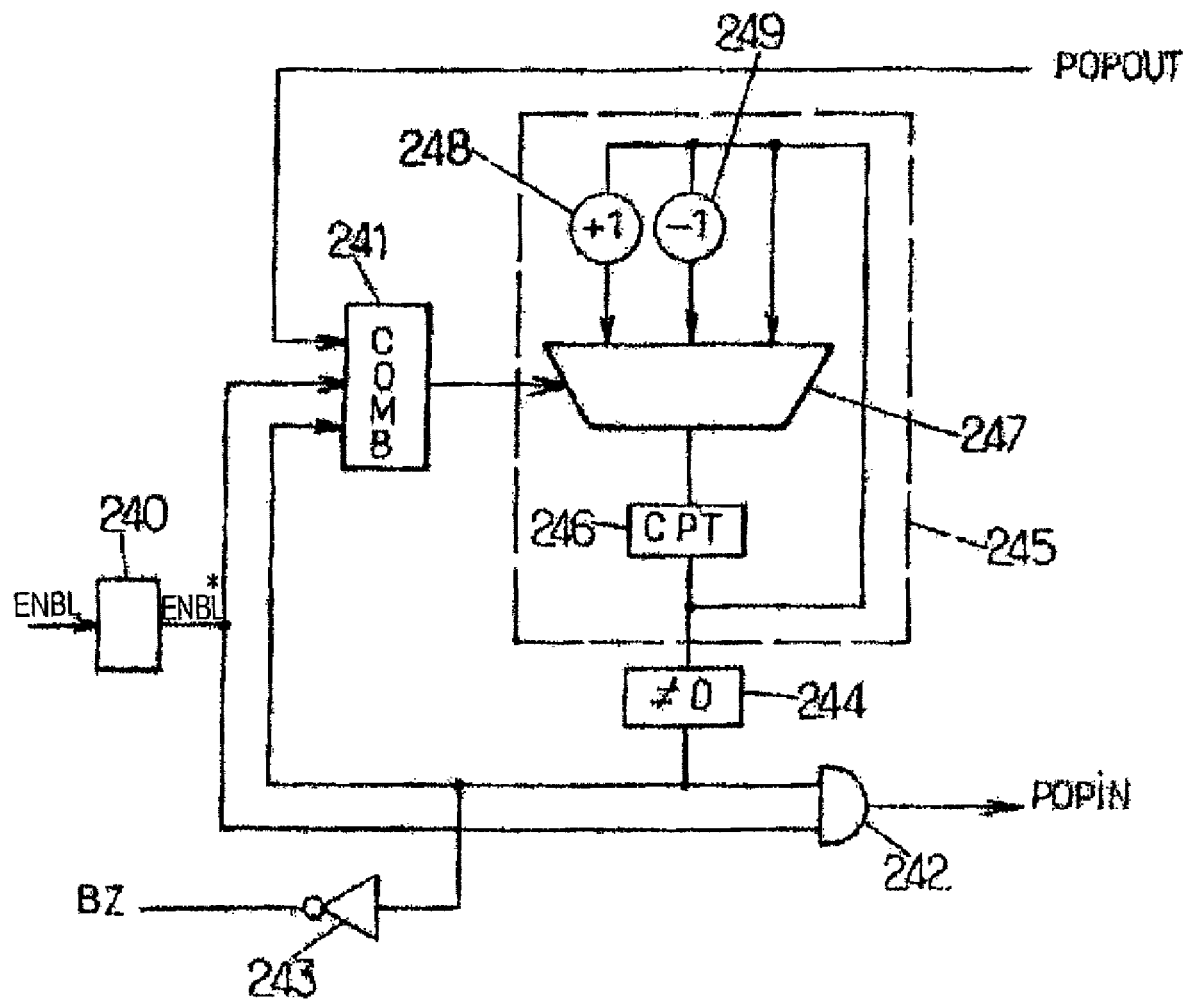
FIG. 2 is a diagram of a transmission enable circuit managing the transmission of the data.

An exemplary embodiment of the enable circuit 24 is represented in FIG. 2. In this example, the enable circuit 24 comprises a register 240, logic circuits 241 to 243, a comparator 244 and a counter/decounter 245.

The register 240 is used to synchronize the signal ENBL with the data word of the register 20, by virtue of the clock signal which regulates the register 20.

The logic circuit 241 supplies control signals to the counter/decounter 245 to increment it, decrement it or keep it at the same value according to a signal ENBL*, which corresponds to the output signal ENBL of the register 240, to the signal POPOUT and the value of the variable CPT. The control signals determine the value of CPT at the next active edge of the clock signal. Table 1 below indicates how the variable CPT evolves according to the inputs.

TABLE 1

| ENBL* | CPT value | POPOUT | Next CPT |
|---|---|---|---|
| Inactive | = 0 | Inactive | = CPT |
| Inactive | = 0 | Active | = CPT + 1 |
| Inactive | ≠ 0 | Inactive | = CPT |
| Inactive | ≠ 0 | Active | = CPT + 1 |
| Active | = 0 | Inactive | = CPT |

TABLE 1-continued

| ENBL* | CPT value | POPOUT | Next CPT |
|---|---|---|---|
| Active | = 0 | Active | = CPT + 1 |
| Active | ≠ 0 | Inactive | = CPT − 1 |
| Active | ≠ 0 | Active | = CPT |

The logic circuit 242 determines the state of the signal POPIN according to the value of the variable CPT and of the signal ENBL, as indicated in Table 2 below. In the example described, the logic circuit 242 is a simple AND gate because the signal ENBL* is active at the level "1" and the output signal of the comparator is positioned at the level "1" if the value of the variable CPT is not zero.

TABLE 2

| ENBL* | CPT value | POPIN |
|---|---|---|
| Inactive | = 0 | Inactive |
| Inactive | ≠ 0 | Inactive |
| Active | = 0 | Inactive |
| Active | ≠ 0 | Active |

The logic circuit 243 is for example a NOT gate which inverts the output signal from the comparator 244, thus supplying the active signal BZ at the level "1" when the variable CPT equals zero.

The comparator 244 is connected to the output of the counter 245 to compare the variable CPT with the value zero and supply a signal, which is for example at the level "1" when the variable is not zero and at the level "0" when the latter is zero. As an example, a NOT-AND gate having as many inputs as the variable CPT has bits may be suitable as a comparator.

The counter/decounter 245 is used to increment and decrement the variable CPT representative of the memory space available in the buffer 12. Many types of counter/decounter may be used. Preferably, the counter/decounter 245 comprises a register 246, a multiplexer 247, an incrementation circuit 248 and a decrementation circuit 249.

The register 246 is dimensioned to contain enough bits to be able to count from 0 to N, where N is an integer corresponding to the number of data words that the buffer 12 can store. The register may be positioned, for example during an initialization of the circuit, at the value N. The output of the register 246 forms the output of the counter/decounter 245 and it is connected to the input of the comparator 244. The input of the register 246 is connected to a data output of the multiplexer 247 to store a new value of the variable CPT on each clock signal edge.

The incrementation circuit 248 comprises an input connected to the output of the register 246 and an output that delivers the variable CPT incremented by one unit. The decrementation circuit 249 comprises an input connected to the output of the register 246 and an output that delivers the variable CPT decremented by one unit.

The multiplexer 247 has three data inputs and one control input. The control input is connected to the logic circuit 241 to receive the control signals indicating which data input must be connected to the data output. One of the data inputs is connected to the output of the register 246 to keep the variable CPT unchanged. Another data input is connected to the output of the incrementation circuit 248 to be able to increment the variable CPT. The last data input is connected to the output of the decrementation circuit 249 to decrement the variable CPT.

Figure 3:
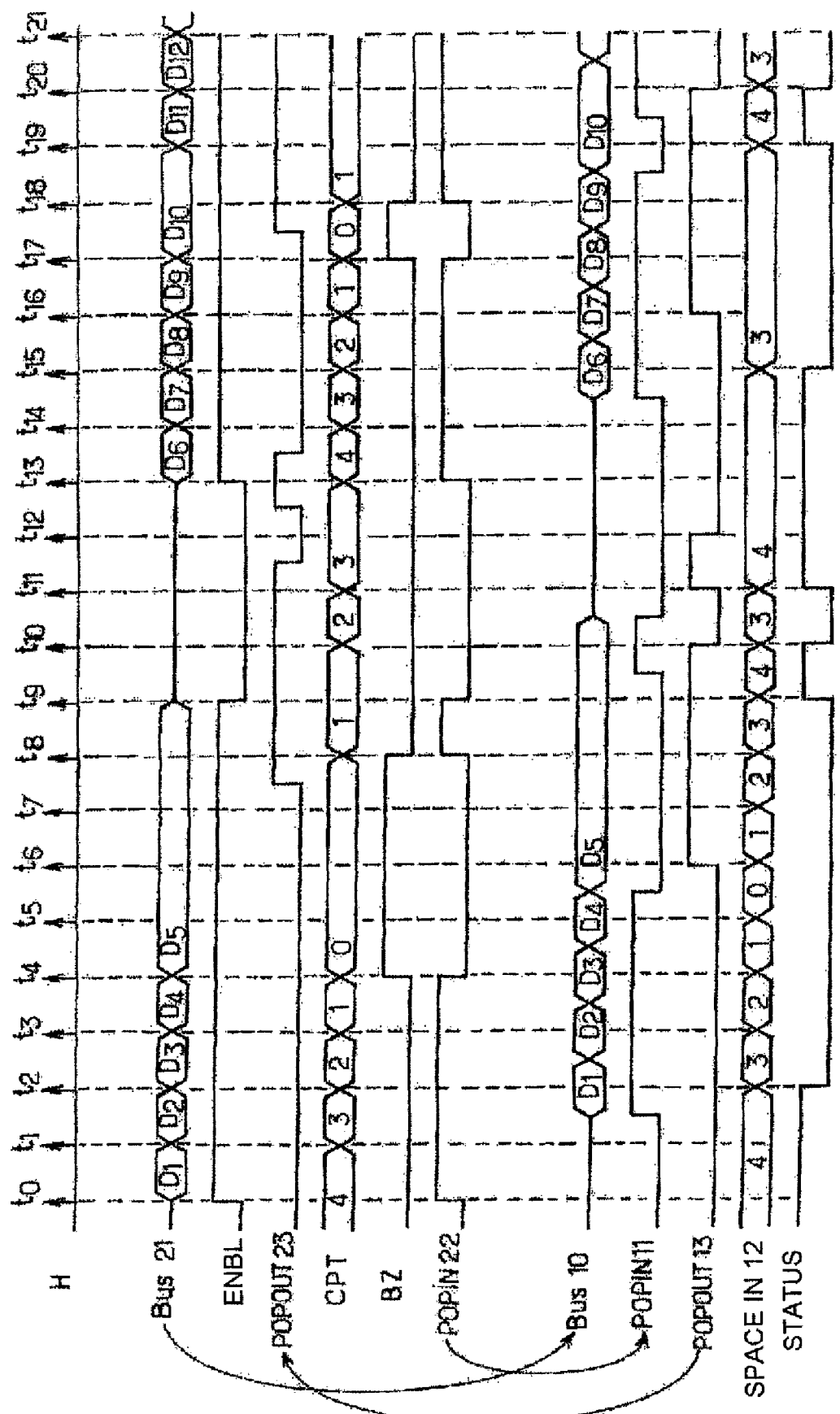
FIG. 3 shows timing diagrams of data interchanges between the two circuits in accordance with the present invention.

Two examples of data transfer from the circuit 2 to the circuit 1 are illustrated by FIG. 3. In these examples, the conductors cause a propagation delay of 1.5 times the clock signal period. The size of the data buffer 12 corresponds to four data words, and the register 246 is a three-bit register.

The clock signal H is represented by a Dirac comb in which each pulse corresponds to an active edge of the said clock signal. Each pulse is spaced from the next pulse by one period of the clock signal. As previously indicated, the clock signal is received synchronously by all the circuits. The instants $t_i$, indicated above the clock signal H, are used for chronological identification in the indications that follow.

The first example is described between the instants $t_0$ and $t_{13}$, and the second example is described between the instants $t_{13}$ and $t_{21}$. These two examples are considered to be produced successively in order to highlight the advantages of the invention relative to the prior art.

It is supposed that, before the instant to, the buffer 12 is empty, the variable CPT is at the value "4" which indicates that four data words may be sent to the circuit 1. The core of the circuit 2 is preparing to send a first data word D1 and the signal ENBL (not shown) is positioned at an active level.

At the instant to, the word D1 is stored in the register 20, the signal ENBL is stored in the register 240 and the signal ENBL* becomes active. The word D11 appears on the port 21 and begins to be propagated on the conductors 3. The signal POPIN becomes active and its activation edge is propagated on the conductor 4. The logic circuit 241 positions the multiplexer 247 in order to decrement the variable CPT in response to the next clock edge. The signal BZ remains inactive and the core of the circuit 2 may prepare a second data word D2 to be sent.

At the instant $t_1$, the variable CPT is decremented and the word takes the value "3". The word D2 is stored by the register 20 and appears on the port 21, and the signal POPIN remains active on the output terminal 22. The core of circuit 2 prepares another data word D3 to be sent.

Between the instants $t_1$ and $t_2$, the word D1 and the activation edge of the signal POPIN arrive at the first circuit 1. Account is taken of the propagation time on the conductors 3 and 4 respectively. It will be noted that the conductors 3 to 5 act as transmission channels and may support several items of data at the same time, which are propagated successively over the length of the said conductors.

At the instant $t_2$ then at the instant $t_3$, the circuit 2 delivers the data word D3 then another data word D4 on the port 21 and the signal POPIN remains activated on the output terminal 22 to enable the two transmissions. The variable CPT is decremented and takes the values 2 then 1. After $t_3$, the core of the circuit 2 prepares the next item of data that is to say a data word.

With regard to the circuit 1, at the instant $t_2$, the buffer 12 stores the data word D1, whose transmission is enabled by the activation of the signal POPIN on the input terminal 11. At the instants $t_3$, $t_4$ and $t_5$, the buffer 12 stores successively the data words D2, D3, D4. Since no data word has left the buffer 12 at the instant $t_5$, there is no memory space available in the said buffer allowing another data word to be stored in the buffer without overwriting another data word.

Nevertheless, at the instant $t_4$, the variable CPT changed to the value "0". The transition to the value "0" of the variable CPT causes the deactivation of the signal POPIN at the output terminal 22 of the circuit 2, whereas the data word D5 is positioned on the port 21. In addition, the signal BZ becomes active, thereby indicating to the core of the circuit 2 that the data word D5 cannot be sent and therefore that it is useless to prepare a subsequent data word.

From the instant $t_4$ to the instant $t_7$, nothing changes in the circuit 2. The data word D5 is held on the port 21 awaiting the transmission enable. The signal POPIN remains inactive. Thus, at the instants $t_5$ to $t_7$, the word D5 is present at the port 10 of the circuit 1 but is not enabled by the signal POPIN and therefore is not stored in the buffer 12.

In parallel, between the instants $t_5$ and $t_6$, the core of the circuit 1 activates the read/delete signal READ/DEL to indicate that it is reading the data word D1 and that the latter may be deleted from the buffer 12. The signal is sampled at the instant $t_6$ by the register 14 which then activates the signal POPOUT at the output terminal 13. The core of the circuit 2 continues to read the data words so long as the status signal remains inactive, thus indicating that the buffer 12 is not empty. The signal POPOUT is thus held after each read of a data word.

The activation edge of the signal POPOUT arrives at the input terminal 23 between the instants $t_7$ and $t_8$. The signal POPOUT is recognized by the enable circuit 24 at the instant $t_8$. The variable CPT is incremented and goes to the value "1". The signal BZ is deactivated. The signal POPIN may then be activated at the terminal 22, this activation being propagated to the input terminal 11 between the instants $t_9$ and $t_{10}$.

In the example, since the core of the circuit 2 has no other data word to send before the instant $t_{13}$, the signal ENBL is deactivated as soon as the signal BZ becomes inactive because the data word D5 is considered to be sent. The signal ENBL* then becomes inactive between the instants $t_9$ and $t_{13}$; the signal POPIN also remains inactive between the instants $t_9$ and $t_{13}$. The port 21 may be held at any value. This is represented in FIG. 3 by an absence of a data word between the instants $t_9$ and $t_{13}$.

At the instant $t_9$, the signal POPOUT remains active indicating that a data word has been extracted from the buffer 12 but the data word D5 has also just been sent. Since the variable CPT must be simultaneously incremented and decremented, the latter remains unchanged at the value "1".

In parallel, from $t_6$ to $t_9$, the core of the circuit 1 has continued to read the data present in the buffer 12 until the buffer 12 is empty, causing the activation of the status signal at the instant $t_9$. The signal POPOUT is held active at the output terminal 13 until the instant $t_{10}$ to indicate the read operations successively made.

At the instant $t_{10}$, the data word D5 is present at the port 10 and the signal POPIN is active at the input terminal 11, which makes it possible to store D5 in the buffer 12. The status signal is deactivated at the instant $t_{10}$ and the data word D5 is read by the core of the circuit 1 at the instant $t_{10}$.

At the instant $t_{11}$, the status signal is reactivated until the receipt of a further data word. The signal POPOUT is activated on the output terminal 13 from $t_{11}$ to $t_{12}$ to indicate that D5 has been extracted from the buffer 12.

The signal POPOUT being active on the input terminal 23 at the instants $t_{10}$ and $t_{11}$, the variable CPT is incremented successively and takes the values "2" then "3". At the instant $t_{12}$, the signal POPOUT is inactive on the input terminal 23 which holds the variable CPT at the value "3". At the instant $t_{13}$, the signal POPOUT is active on the input terminal 23 which increments the variable CPT to the value "4".

This first example shows that it is possible to send successively the data words D1 to D4 while avoiding sending the data word D5 before receiving any signal from the circuit 1. This example shows that the invention can be used to send a succession of data words without it being necessary to wait between each transmission for information indicating that it is possible to send a new data word to the buffer 12. However, this first example shows a case in which the data words wait in the buffer 12 before being read by the core of the circuit 1, and does not show the full effectiveness of the invention.

The second example of data transmission, which begins at the instant $t_{13}$ shows a data interchange in which the sending circuit 2 sends data words as quickly as possible and in which the receiving circuit 1 extracts the data words as quickly as possible.

At the instant $t_{13}$, the buffer 12 is empty, the variable CPT is set to the value "4". The data word D6 is stored in the register 20 and appears on the port 21, the signal ENBL* becomes active. The signal POPIN becomes active at the output terminal 22. The logic circuit 241 positions the multiplexer 247 to decrement the variable CPT at the next clock edge. The signal BZ remains inactive and the core of the second circuit 2 may prepare to send the data word D7.

At the instants $t_{14}$, $t_{15}$ and $t_{16}$, the variable CPT takes the values respectively "3", "2" and "1", the data words D7 to D9 are successively stored in the register 20 and appear on the port 21, the signal POPIN remains active on the output terminal 22. The core of the circuit 2 prepares the following data words, respectively D8 to D10.

Between the instants $t_{14}$ and $t_{15}$, the data word D1 and the activation of the signal POPIN arrive at the receiving circuit 1.

At the instant $t_{15}$, the buffer 12 stores the data word D6 enabled by the activation of the signal POPIN at the input terminal 11. The status signal becomes inactive, the core of the circuit 1 reads the data word D6 and activates the read/delete signal READ/DEL.

At the instant $t_{16}$, the data word D7 is stored in the buffer 12, the status signal remains inactive and the core of the circuit 1 reads the data word D7 and holds the read/delete signal activated. The signal POPOUT is activated on the output terminal 13.

At the instant $t_{17}$, the data word D10 is stored in the register 20 and appears on the bus 21. The signal ENBL* remains active, but the signal POPOUT is still inactive on the input terminal 23, such that the variable CPT goes to the value "0". The signal BZ becomes active and the signal POPIN becomes inactive on the output terminal 22. At this same instant $t_{17}$, the data word D8 is stored in the buffer 12, which holds the status signal inactive and the core of the circuit 1 reads this word D8. The signal POPOUT remains active on the output terminal 13.

Between the instants $t_{17}$ and $t_{18}$, the activation of the signal POPOUT arrives at the input terminal 23.

At the instant $t_{18}$, the signal POPOUT is recognized by the enable circuit 24. The variable CPT is incremented and goes to "1", the signal BZ is deactivated and the signal POPIN becomes active on the output terminal 22. The data word D10 is then sent to the first circuit 1. The core of the sending circuit 2 prepares to send the data word D11 and the signals ENBL and ENBL* are held active. Still at the instant $t_{18}$, the data word D9 returns to the buffer 12, the status signal is held inactive and the core of the receiving circuit 1 reads this word D9. The signal POPOUT remains active on the output terminal 13.

At the instant $t_{19}$, the signal POPOUT is held active on the input terminal 23 while the data word D10 has just been sent. The variable CPT is held at "1", the signal BZ remains deactivated and the signal POPIN remains active on the output terminal 22. The data word D11 is then sent to the receiving circuit 1. The core of the sending circuit 2 prepares to send the data word D12 and the signals ENBL and ENBL* are held active. Still at the instant $t_{19}$, the data word D10 appears on the bus 10 but is not enabled by the signal POPIN which is inactive on the input terminal 11. The status signal becomes active and the core of the circuit 1 cannot read the data. The signal POPOUT remains active on the output terminal 13 following the extraction of the data word D9 from the buffer 12.

At the instant $t_{20}$, the signal POPOUT is held active on the input terminal 23, while the data word D11 has just been sent. The variable CPT is held at "1", signal BZ remains deactivated and the signal POPIN remains active on the output terminal 22. The data word D12 is then sent to the receiving circuit 1. The core of the sending circuit 2 prepares to send the data word D13 and the signals ENBL and ENBL* are held active. Still at the instant $t_{20}$, the data word D10, present on the bus 10, is enabled by the signal POPIN which is active on the input terminal 11. The status signal becomes inactive and the core of the circuit 1 reads the word D10. The signal POPOUT becomes active on the output terminal 13.

The instant $t_{21}$ corresponds to a repetition of what is done at the instant $t_{16}$. The cycle of operations from $t_{16}$ to $t_{20}$ is repeated so long as the circuit 2 has data to send and so long as the circuit 1 can read the data words present in the buffer 12. This second example shows that it is possible to achieve a data rate equal to 4/5 of the maximum data rate that would correspond to one data word sent per clock signal period.

The maximum data rate can be achieved by slightly modifying the circuits. Specifically, the use of a buffer that can store five data words makes it possible to achieve this maximum data rate. If the requirement is to always obtain a maximum data rate, a buffer should be used that can store N words, with N verifying $N \geq 2*k+j$, where k is an integer so that $(k-1)*T < \Delta T \leq k*T$, with T being the minimal period separating two successive transmissions of data words, $\Delta T$ being the propagation time of a data word on the conductors 3 to 5, and j being the number of clock periods necessary to read a data word and return the extraction information POPOUT.

Preferably, $N \geq 2*k$ is chosen because the value j may be reset for example by using a clock phase shift for the writing and reading of a data word in the buffer.

The invention has been described hereinabove in non-limiting embodiments. In particular, consideration has been given to a synchronous data transfer between the sending circuit and the receiving circuit, using a single clock signal.

However, each circuit may be activated by a specific clock signal, if synchronization modules are provided respectively for the signal POPIN and for the signal POPOUT. Similarly, the data transfer between the sending circuit and the receiving circuit may be totally asynchronous if an acknowledgement mechanism is provided for the transmission of the signals POPIN and POPOUT.

In addition, the description has been of an example of an integrated electronic circuit that includes a receiving circuit 1 having a single input buffer 12 and a sending circuit 2 having a single output register 20.

Figure 4:
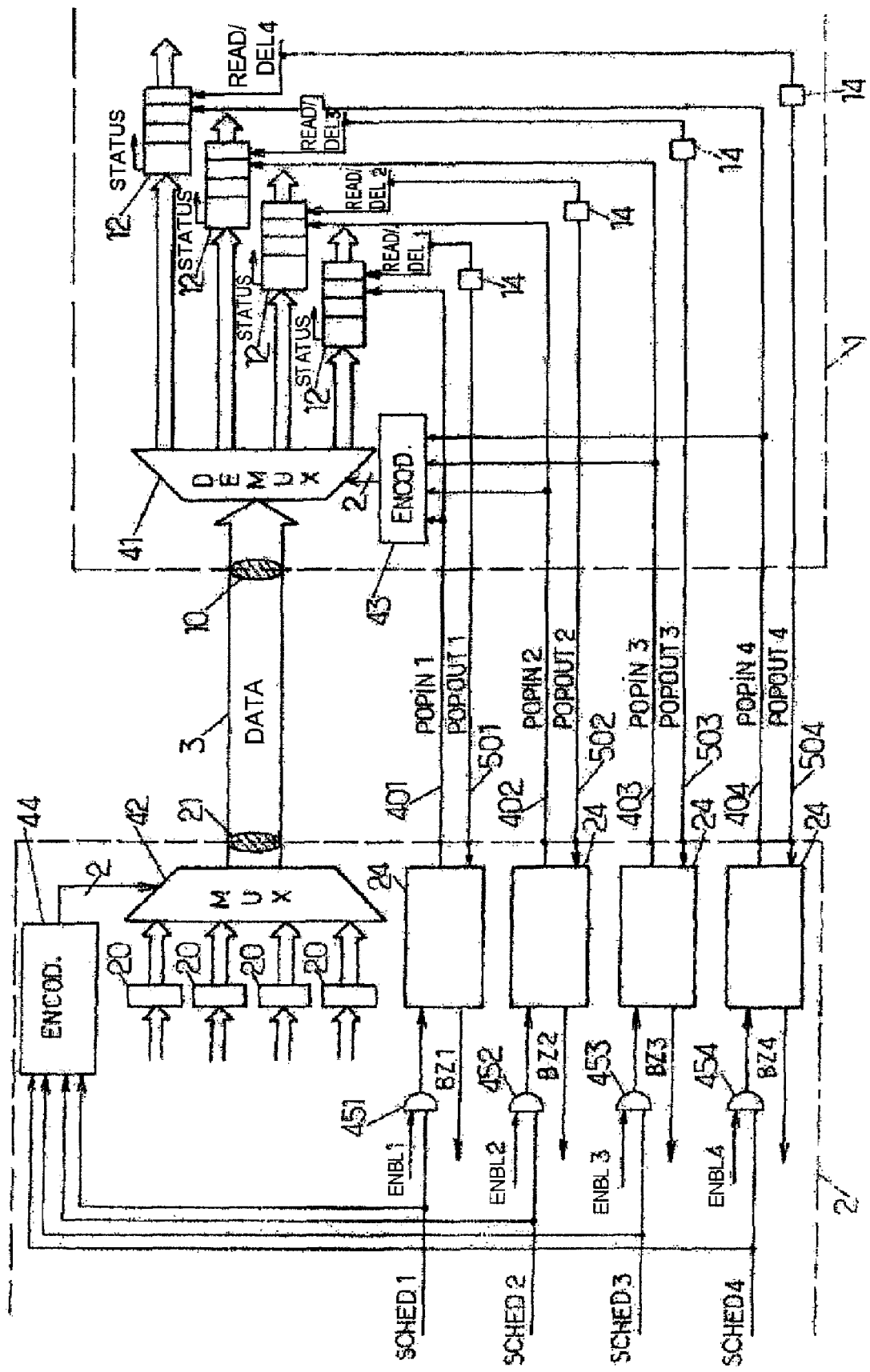
FIG. 4 is a diagram of another exemplary interfacing between two circuits in an integrated electronic circuit according to another embodiment of the invention.

Nevertheless, with reference to the diagram in FIG. 4, the circuit 1 may have a plurality of input buffers 12 (here four such input buffers), coupled to the input port 10 via a demultiplexer 41. Similarly, the circuit 2 may have a plurality of output registers 20 (also four), coupled to the output port 21 via a multiplexer 42, and as many enable circuits 24. These circuits 24 receive from the core of the circuit 2 signals respectively ENBL1 to ENBL4, and supply to the core of the circuit 2 signals respectively BZ1 to BZ4. OR ports, respectively 451 to 454, are used to select one of the enable circuits 24, with the aid of control signals respectively Sched1 to Sched4, of which at most only one is active on each clock cycle. The sending circuit 2 also comprises a digital encoder 44 which, based on the signals Sched1 to Sched4, controls the multiplexer 42 so that only one of the registers 20 is coupled to the output port 21.

Conductors 401 to 404 connect respectively each of the enable circuits 24 to one of the input registers 12 of the circuit 2, for the transmission of signals respectively POPIN1 to POPIN4. Conversely, conductors 501 to 505 connect respectively each of the registers 14 and the circuit 2 to one of the enable circuits 24 of the circuit 1, for the transmission of signals respectively POPOUT1 to POPOUT4.

With regard to the receiving circuit 2, read/delete signals READ/DEL1 to READ/DEL4 are received from the core of the circuit, respectively by each of the registers 14, on the one hand, and by each of the input buffers 12, on the other hand. In addition, a digital encoder 43 controls the demultiplexer 41 based on these signals so that the input port 10 is coupled to only one of the input buffers 12 on each clock cycle.

The data transfer between the circuits 1 and 2 of FIG. 4 is in other respects identical to that described hereinabove for the circuits 1 and 2 of FIG. 1.

Although, for reasons of ease of presentation, the plurality of data streams described hereinabove with reference to FIG. 1 has been envisaged between the sending circuit 1 and the receiving circuit 2, these data streams may be interchanged between more than one sending circuit and/or more than one receiving circuit. This is equivalent to breaking the functional unity that exists between the means of the circuit 1 on the one hand, and the means of the circuit 2 on the other hand. In other words, the data bus 3 may be shared (by time-division multiplexing) between a plurality of distinct data streams.

It will be noted that, although a single data stream occupies the data bus 3 on each clock cycle, all the enable circuits 24 may work in parallel. Specifically, more than one of the signals POPOUT1 to POPOUT4 in the example of FIG. 4 may be active at the same time.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claim is:

1. An integrated electronic circuit comprising:
   a first circuit including:
      an input port for receiving data words,
      at least one input terminal for receiving an enable signal,
      at least one input buffer coupled to the input port and capable of temporarily storing a determined number of data words received via the input port in response to the activation of the enable signal,
      at least one output terminal for sending an item of extraction information when a data word is extracted from the input buffer;
   a second circuit including:
      an output port for sending data words,
      at least one output terminal for sending the enable signal,
      at least one input terminal for receiving the item of extraction information,
      at least one enable circuit configured to activate the enable signal according to an item of availability information representative of the memory space available in the input buffer, the said item of availability information being updated in response to the transmission of a data word and to the receipt of the item of extraction information wherein the enable circuit includes a counter that is incremented on receipt of the item of extraction information and that is decremented on activation of the enable signal, the item of availability information being linked to the current value of the counter; and a plurality of conductors coupling together the second circuit and the first circuit, and including a data bus coupling the input port of the first circuit to the output port of the second circuit, a connection coupling the input terminal of the first circuit to the output terminal of the second circuit, and a connection coupling the output terminal of the first circuit to the input terminal of the second circuit.

2. The circuit of claim 1 wherein the enable circuit comprises a logic circuit that activates the enable signal when a data word is presented to the output port if the value of the counter indicates that the input buffer has the memory space available to save at least one data word.

3. The circuit of claim 1 wherein the plurality of conductors have a data propagation time lying between k−1 and k times a minimal time that can separate two data words successively sent via the conductors, where k is a positive integer, and the number of data words that can be stored simultaneously in the input buffer is greater than or equal to 2×k.

4. The circuit of claim 1 wherein the first circuit is suitable for sending an item of extraction information to the second circuit every time a data word is extracted from the input buffer.

5. The circuit of claim 1 wherein the data bus is shared between several data streams by time-division multiplexing.

6. A method of data transfer between a first circuit and a second circuit formed in an integrated electronic circuit, the said first and second circuits coupled together by means of a plurality of conductors, and the first circuit including a data buffer capable of temporarily storing a determined number of data words, the method comprising the steps of:

transmitting by the second circuit a data word to the data buffer if an item of availability information representative of the memory space available in the input buffer indicates that at least one data word may be stored in the input buffer;

in response to the extraction of a data word from the buffer, transmitting from the first circuit an item of extraction information to the second circuit;

in response to the transmission of a data word by the second circuit or in response to the receipt by the second circuit of an item of extraction information, updating the item of availability information in the second circuit, wherein the item of availability information is updated by incrementing the value of a counter in response to the receipt by the second circuit of an item of extraction information, and by decrementing the value of the said counter in response to the transmission of a data word by the second circuit.

7. The method of claim 6 wherein the transmission of a data word by the second circuit comprises the steps of:

placing the data word on a data bus coupling an output port of the first circuit to an input port of the first circuit, and, activating an enable signal transmitted between an output terminal of the second circuit and an input terminal of the first circuit, if the item of availability information indicates that the input buffer has the memory space available to save at least one data word.

8. A circuit, comprising:

a first circuit including a buffer configured to receive data in response to a first control signal and to output data in response to an extraction signal; and a second circuit including an enable circuit configured to receive an enable signal and the extraction signal and to generate the first control signal in response thereto, and further including a data register for storing and transferring the data to the buffer in response to the enable and extraction signals, wherein the enable circuit includes a counter that is incremented upon receipt of the extraction signal and that is decremented in response to the enable signal.

9. The circuit of claim 8 wherein the first circuit is configured to transmit a status signal regarding the status of the data in the buffer.

10. The circuit of claim 8 wherein the second circuit is configured to transmit a condition signal regarding the condition of the availability of the buffer to receive data.

11. The circuit of claim 8 further comprising a plurality of conductors coupling the first circuit to the second circuit.

12. A circuit for interfacing a data transmitter circuit with a data receiver circuit, the interfacing circuit comprising:

an input circuit coupled to the data transmitter circuit, the input circuit including a register to store data from the data transmitter circuit and to transfer the data, an enable logic circuit adapted to receive an enable signal and a selection signal from the data transmitter circuit and to generate an enabling signal in response thereto, and an enable circuit configured to receive the enabling signal from the enable logic circuit and an extraction signal from the data receiver circuit and to generate a control signal in response thereto; and an output circuit coupled to the data receiver circuit, the output circuit including a buffer configured to receive the data from the register of the input circuit in response to the control signal and to transfer the data to the data receiver circuit from the buffer in response to the extraction signal.

13. The interfacing circuit of claim 12 wherein the enable circuit of the input circuit is configured to generate a feedback signal to the data transmitter circuit regarding availability of the buffer in the output circuit to receive data.

14. The interfacing circuit of claim 12 wherein the output circuit is configured to generate a status signal to the data receiver circuit regarding the availability of data in the buffer to transfer to the data receiver circuit.

15. The interfacing circuit of claim 12 wherein the enable circuit includes a counter that is incremented on receipt of the extraction signal and that is decremented on receipt of the enabling signal from the enable logic circuit.

16. The interfacing circuit of claim 15 wherein the enable logic circuit is configured to generate the enable signal when data is present on an output port coupled to the register if a value of the counter indicates that the buffer in the output circuit has memory space available to save the data.

17. The circuit of claim 12, further comprising a plurality of conductors coupling the input circuit and the output circuit, the plurality of conductors having a data propagation time lying between k−1 and k times a minimal time that can separate two data words successively sent via the plurality of conductors, where k is a positive integer and the number of data words that can be stored simultaneously in the buffer of the output circuit is greater than or equal to 2 times k.

18. A method of transferring data between a data transmitter circuit and a data receiver circuit using an interfacing circuit that has an input circuit coupled to the data transmitter circuit and including a register to store data from the data transmitter circuit and to transfer the data, and an enable circuit configured to receive an enable signal from the data transmitter circuit and an extraction signal from the data receiver circuit and to generate a control signal, and the interfacing circuit also including an output circuit coupled to the receiving circuit, the output circuit having a buffer configured to receive the data from the input circuit in response to the control signal and to transfer the data to the data receiver circuit in response to the extraction signal, the method comprising:

generating a control signal in response to receipt of an enable signal and a selection signal from the data transmitter circuit;

transferring data from the data transmitter circuit to the register of the input circuit;

receiving an extraction signal from the data receiver circuit and transferring data from the register in the input circuit to the buffer in the output circuit; and transferring data from the buffer in the output circuit to the data receiver circuit upon receipt of the extraction signal from the data receiver circuit.

19. The method of claim 18 wherein the receiving of data in the buffer of the output circuit includes generating a status signal from the output circuit to the data receiver circuit regarding the status of data in the buffer of the output circuit.

20. The method of claim 18 wherein the generating of the control signal further comprises generating a condition signal to the data transmitter circuit regarding the ability of the buffer in the output circuit to receive data from the register in the input circuit.

21. The method of claim 18, further comprising incrementing the value of a counter in response to receipt by the input circuit of the extraction signal and decrementing the value of the counter in response to transfer of data in the register from the input circuit to the buffer of the output circuit.

22. A multi-core microprocessor, comprising:
a first circuit having:
   a first core,
   a first circuit input terminal configured to receive an enable signal,
   an input buffer coupled to the first core and configured to store data words received from a second circuit,
   a first circuit output terminal configured to pass an extraction signal when a data word from the input buffer is supplied to the first core;
the second circuit having:
   a second core,
   a second circuit output terminal coupled to the first circuit input terminal and configured to pass the enable signal to the first circuit,
   a second circuit input terminal coupled to the first circuit output terminal and configured to receive the extraction signal,
   a counter circuit configured to maintain a current count, the counter circuit further configured to increment when the extraction signal is received and decrement when a data word from the second core is passed to the input buffer, and
   an enable circuit coupled to the counter circuit, the enable circuit configured to assert the enable signal according to the current count.

23. The multi-core microprocessor of claim 22 wherein the current count is representative of space available in the input buffer.

24. The multi-core microprocessor of claim 22 wherein the enable circuit includes logic to assert the enable signal when the data word from the second core is passed to the first circuit.

25. The multi-core microprocessor of claim 22, further comprising:
a plurality of conductors coupled between the first circuit and the second circuit, the plurality of conductors having a data propagation time in the range of (k−1) to (k) times a minimal time that can separate two data words successively passed via the plurality of conductors, wherein k is a positive integer, and a number of data words that can be held simultaneously in the input buffer is greater than or equal to (2k).

26. The multi-core microprocessor of claim 22, further comprising:
a comparator coupled to the counter and the enable circuit, the comparator configured to compare the current count with zero.

27. A circuit comprising:
a data transmitter circuit;
a data receiver circuit;
an interfacing circuit coupled to the data transmitter circuit, the interfacing circuit including a register to store data from the data transmitter circuit and to transfer the data to the data receiver circuit;
an enable logic circuit adapted to receive an enable signal and a selection signal from the data transmitter circuit and to generate a control signal in response to said signals; and
an output circuit coupled to the data receiver circuit, the output circuit including a buffer configured to receive the data from the register of the interfacing circuit in response to the control signal and to transfer the data to the data receiver circuit from the buffer.

28. A circuit comprising:
a data transmitter adapted to operate at a data transmitter clock frequency;
a data receiver adapted to operate at a data receiver clock frequency, the data receiver clock frequency different than the data transmitter clock frequency;
an interfacing circuit coupled to the data transmitter, the interfacing circuit including at least one register adapted to store data in transit between the data transmitter and the data receiver;
an enable logic circuit adapted to receive an enable signal and a selection signal from the data transmitter and further adapted to generate a control signal in response to the enable signal and the selection signal;
an output circuit coupled to the data receiver, the output circuit including a memory space adapted to receive the data in transit between the data transmitter and the data receiver in response to the control signal, the output circuit further adapted to transfer the data in transit between the data transmitter and the data receiver from the memory space to the data receiver.

* * * * *